(12) United States Patent
Saha

(10) Patent No.: US 10,187,126 B2
(45) Date of Patent: Jan. 22, 2019

(54) METHOD AND SYSTEM FOR SCHEDULING AND MITIGATING CROSS-CELL INTERFERENCE

(71) Applicant: Hughes Systique Private Limited, Delhi (IN)

(72) Inventor: Abheek Saha, Gurgaon (IN)

(73) Assignee: Hughes Systique Private Limited, Delhi (IN)

( * ) Notice: Subject to any disclaimer, the term of this patent is extended or adjusted under 35 U.S.C. 154(b) by 93 days.

(21) Appl. No.: 15/377,727

(22) Filed: Dec. 13, 2016

(65) Prior Publication Data

US 2017/0170914 A1    Jun. 15, 2017

(30) Foreign Application Priority Data

Dec. 14, 2015 (IN) ............................ 4100/DEL/2015

(51) Int. Cl.
*H04W 36/30* (2009.01)
*H04B 7/0413* (2017.01)
*H04B 7/024* (2017.01)

(52) U.S. Cl.
CPC ........... *H04B 7/0413* (2013.01); *H04B 7/024* (2013.01)

(58) Field of Classification Search
CPC ....... H04B 3/32; H04B 3/23; H04L 25/03343; H04L 25/497; H04L 25/03057; H04W 36/30; H04W 36/0094; H04W 36/0055; H04W 36/0061; H04W 24/02; H04W 24/10; H04W 92/20

USPC ................................ 375/259–285, 295–296
See application file for complete search history.

(56) References Cited

U.S. PATENT DOCUMENTS

| 6,778,509 | B1* | 8/2004 | Ravishankar | ...... H04B 7/18589 370/322 |
| 7,457,588 | B2* | 11/2008 | Love | ...................... H04L 1/0026 370/208 |
| 9,184,898 | B2* | 11/2015 | Love | ...................... H04B 7/063 |
| 9,198,009 | B2* | 11/2015 | Kumar | .................... G06Q 30/02 |
| 9,262,244 | B2* | 2/2016 | Kumar | .................... G06F 9/546 |
| 9,301,184 | B2* | 3/2016 | Bontu | ............... H04W 36/0094 |
| 9,313,670 | B2* | 4/2016 | Martin | ............. H04W 36/0083 |
| 9,888,353 | B2* | 2/2018 | Reed | ....................... H04W 8/02 |
| 9,913,186 | B2* | 3/2018 | Yang | ..................... H04W 36/36 |
| 9,918,196 | B2* | 3/2018 | Reed | ....................... H04W 8/02 |
| 9,985,743 | B2* | 5/2018 | Love | ...................... H04B 7/063 |

(Continued)

*Primary Examiner* — James M Perez
(74) *Attorney, Agent, or Firm* — Knobbe Martens Olson & Bear LLP

(57) ABSTRACT

The present invention provides a method and a system for scheduling and mitigating cross-cell interference. The system comprises a plurality of N network nodes, each having a baseband processor and a transmit antenna $N_t$, capable of handling multiple input multiple output (MIMO) channels, communicatively coupled with a plurality of K co-residents user equipment (UEs); a central scheduler configured to control scheduling of said plurality of network nodes; wherein each network node is configured to select a plurality of UEs and provide the shortlisted UEs to the central scheduler; the central scheduler in turn identifies a target set of UEs and the co-residents for each network node; and the network node is configured to pre-select signal-to-noise power to the target UEs without impacting transmission of co-residents UEs.

14 Claims, 7 Drawing Sheets

(56) References Cited

U.S. PATENT DOCUMENTS

| | | | | |
|---|---|---|---|---|
| 2007/0026808 A1* | 2/2007 | Love | H04L 1/0026 | 455/67.7 |
| 2007/0026810 A1* | 2/2007 | Love | H04B 7/063 | 455/67.11 |
| 2012/0149429 A1* | 6/2012 | Martin | H04W 24/02 | 455/525 |
| 2014/0233408 A1* | 8/2014 | Bontu | H04W 36/0094 | 370/252 |
| 2014/0293950 A1* | 10/2014 | Benjebbour | H04W 16/32 | 370/329 |
| 2015/0056997 A1* | 2/2015 | Su | H04W 36/08 | 455/436 |
| 2015/0124686 A1* | 5/2015 | Zhang | H04W 76/40 | 370/312 |
| 2015/0312867 A1* | 10/2015 | Cui | H04W 52/0206 | 455/68 |
| 2016/0043828 A1* | 2/2016 | Love | H04B 7/063 | 370/252 |
| 2016/0128092 A1* | 5/2016 | Azarian Yazdi | H04L 5/0048 | 370/329 |
| 2016/0353290 A1* | 12/2016 | Nammi | H04W 16/26 | |
| 2017/0013670 A1* | 1/2017 | Cui | H04W 52/0212 | |
| 2017/0034753 A1* | 2/2017 | Yang | H04W 36/36 | |
| 2017/0289849 A1* | 10/2017 | Yiu | H04W 36/26 | |
| 2017/0318522 A1* | 11/2017 | Ly | H04W 48/14 | |
| 2017/0331670 A1* | 11/2017 | Parkvall | H04J 11/0079 | |

\* cited by examiner

METHOD AND SYSTEM FOR SCHEDULING AND MITIGATING CROSS-CELL INTERFERENCE

CROSS-REFERENCE TO RELATED APPLICATIONS

This application claims the benefit of priority to Indian Patent Application No. 4100/DEL/2015, filed on Dec. 14, 2015, the disclosure of which is hereby expressly incorporated by reference in its entirety.

FIELD

The present invention pertains to a heterogeneous wireless communication network, and more particularly, to a system and method for scheduling and mitigating cross-cell interference in such a network.

BACKGROUND

Next generation cellular networks are expected to be characterized by their extreme density. The current paradigm of having isolated cells (less than 4% overlap) operated by a single, centrally placed cell tower, equipped with dedicated spectrum and isolated from its neighbours by guard bands, will be replaced by a dense network of Distributed Antenna Systems and Remote Radio Heads (hereinafter referred as RRH/'network nodes'), coordinating with each other to share a large coverage region using a shared frequency band.

Thus, the new paradigm offers unprecedented benefits, in terms of instantaneous throughput, energy conservation and edge-of-cell performance. However, it will also have enormous associated challenges with respect to user scheduling and spectrum sharing; especially in cross-node interference.

Heterogenous networks are one such type of network existing in new paradigm. They consist of a mix of macro and pico/femto base stations or small-cells operating in close proximity. Recent innovations in the area of inter-cell association allow these nodes to coordinate closely with each other in real-time to increase system capacity and user service. As networks become more and more squeezed and the reuse distance drops, network operators have demanded additional tools to manage the interference load which limits system performance, especially at the cell edge. In response, the 3GPP has standardized a number of mechanisms for achieving this under the term Inter-cell Interference Coordination (ICIC), followed by enhanced (eICIC) and further enhanced ICIC.

FIG. 1 illustrates Inter-cell Interference Coordination (ICIC) deployment for heterogeneous networks. The network comprises of one macro-cell and several small-cells. Each small-cell shares a common frequency with the macro-cell. There are users in the boundary zone between the macro-cell and any given small-cell, which can receive wireless transmissions either from the macro-cell or by the small-cell. Particular users will be scheduled to use the small-cell and others will be scheduled to use the macro-cell. Since the macro is resource limited, it would like to let the small-cell handle as many users as possible. The small-cells, on the other hand are power limited. Thus, small cells are not able to interfere with each other, but each small-cell can and does interfere with (and are subject to interference from) the macro-cell.

At each point of time, the macro-cell and the small-cell have to schedule transmissions to the UEs associated with each of them. If the macro-cell and the small-cell transmit on the same resource in the same time-slot, there will be interference.

In the standard ICIC/eICIC scenario, the macro-cell will coordinate with the small-cells by creating dedicated time-gaps, called ABS (Almost Blank Subframes) or RBS (Reduced Power Subframes) where the macro-cell either transmits no data or backs-off its transmit power significantly. This gives an opportunity for the small-cells to transmit. However, in these frames the UEs scheduled to the macro do not get data, and in the other sub-frames, it is the UEs scheduled with the small-cells which do not receive data. The ABS/RBS frames count as loss of capacity to the macro-cells (though the capacity saved in one sector could potentially be used in other sectors or destinations).

Coordinated Multipoint (COMP) is a technology based on the ability for multiple endpoints to coordinate as part of a common MIMO (Multiple-Input and Multiple-Output) transmission. The efficiency of MIMO is increased when the number of antennae used are larger and the spatial separation is high. When multiple transmitters or receivers coordinate implicitly or explicitly with each other (using, for example, opportunistic scheduling) in order to use multi-user MIMO, this becomes a case of Coordinated Multipoint (CoMP). Theoretically CoMP can achieve significant gains in throughput by utilizing the statistical diversity of the wireless channels. In reality, there are significant challenges in terms of inter-node coordination.

FIG. 2 shows different forms of multi-user MIMO transmission using Coordinated Multipoint such as Broadcast transmission and Joint Transmission. In Joint Transmission, where one cell (either the macro-cell or the small-cell) could simultaneously transmit to multiple UEs.

In FIG. 3, shows an urban network deployment comprising one macro-cell and several small-cells. In one possible scheme, a pair of the UEs ($ue_s$ and $ue_m$) are treated as a single unit and, based on their measured/reported channel characteristics, the macro-cell decides whether they should be broadcast from the small-cell or itself. This determination could be done for all the UEs which are eligible, on a pair by pair basis. This scheme has the downside of leaving some small cells idle, but has the upside that it mitigates the inter-cell interference, as described below. The problem is that from any given network node, the individual members of the targeted UEs will have different channel conditions, so it will be hard to implement scheduling in a fair yet efficient manner.

In another scheme, which address similar problems include Block diagonalization (BD or zero-forming). Block diagonalization is a technique allows a single transmitter to transmit to multiple receivers simultaneously, without cross-receiver interference. The fundamental principle of BD is to choose orthogonal pre-coding matrices, effectively making each receivers data stream invisible to the others. However, in the case of block-diagonalization, orthogonalization is achieved by choosing a pre-coding matrix which is orthonormal to the co-resident UEs; it does not take the target UEs channel matrix into account. Further, BD is unable to utilize additional antenna ($N_t > N_r$). This means that is unable to utilize modern networks with RRH and massive-MIMO capabilities.

Hence, there is a need to have a system and method that can overcome the above stated problems and provides a system and method with enhanced scheduling and simultaneously maximizing network capacity and mitigating cross-cell interference.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter.

Its sole purpose is to present some concepts of the subject matter in a simplified form as a prelude to the more detailed description that is presented later.

It is therefore a primary objective of this invention to provide a system and method for mitigating cross-cell interference in heterogeneous networks using shared resources.

It is another objective of the present invention is to provide enhanced scheduling and simultaneously maximizing network capacity.

According to the preferred embodiment, two or more network nodes of a heterogeneous network with overlapping coverage regions, simultaneously transmit to a set of UEs attached to them in a manner so as to mitigate cross-cell interference by using a joint encoding technique. The scheme is designed so that the UEs can operate independently of each other, as can the network nodes.

In another embodiment, the present invention provides a system for scheduling and mitigating cross-cell interference, said system comprising a plurality of N network nodes, each having a baseband processor and a transmit antenna $N_t$, capable of handling multiple input multiple output (MIMO) channels, communicatively coupled with a plurality of K co-residents user equipment (UEs); a central scheduler configured to control scheduling of said plurality of network nodes; wherein each network node is configured to select a plurality of UEs and provide the shortlisted UEs to the central scheduler; the central scheduler in turn identifies a target set of UEs and the co-residents for each network node; and the network node is configured to pre-select signal-to-noise power to the target UEs without impacting transmission of co-residents UEs.

In another embodiment, the central scheduler identifies the target set of UEs based on orthogonality of the UE's channel matrix against those previously present in each nodes target-set.

In another embodiment, the central scheduler is configured to receive transmission parameters from specific UEs. The transmission parameters comprises channel capacity information for each of the plurality of co-located UEs and power constraint information at each of the network nodes.

In another embodiment, the network node pre-selects transmission power to the target UEs by implementing pre-coding matrix. The pre-coding matrix is a linear matrix operation which simultaneously separates the channels of the member UEs of the target set.

In another embodiment, the present invention provides a method for scheduling and mitigating cross-cell interference, said method comprising controlling scheduling, by a central scheduler, of a plurality of N network nodes, each having a baseband processor and a transmit antenna $N_t$, and each network node is capable of handling multiple input multiple output (MIMO) channels, communicatively coupled with a plurality of K co-residents user equipment (UEs); selecting, by each network node, a plurality of UEs and provide the shortlist UEs to the central scheduler; identifying, by the central scheduler, a target set of UEs and the co-residents for each network node based on the shortlisted UEs provided by the network node; and pre-selecting, by the network node, signal-to-noise power for the target UEs without impacting transmission of co-residents UEs.

In another embodiment, the method of scheduling comprising sorting the list of all visible UEs in ascending order of the number of nodes; adding UEs to the target set of that node only visible to one node; determining UEs visible to multiple nodes which have to be selected to the node which they will be targeted to; and checking the orthogonality of the UE's channel matrix against those already present in each nodes target-set.

These and other objects, embodiments and advantages of the present invention will become readily apparent to those skilled in the art from the following detailed description of the embodiments having reference to the attached figures, the invention not being limited to any particular embodiments disclosed.

BRIEF DESCRIPTION OF THE DRAWINGS

For a better understanding of the embodiments of the systems and methods described herein, and to show more clearly how they may be carried into effect, reference will now be made, by way of example, to the accompanying drawings, wherein.

DESCRIPTION

Figure 1:
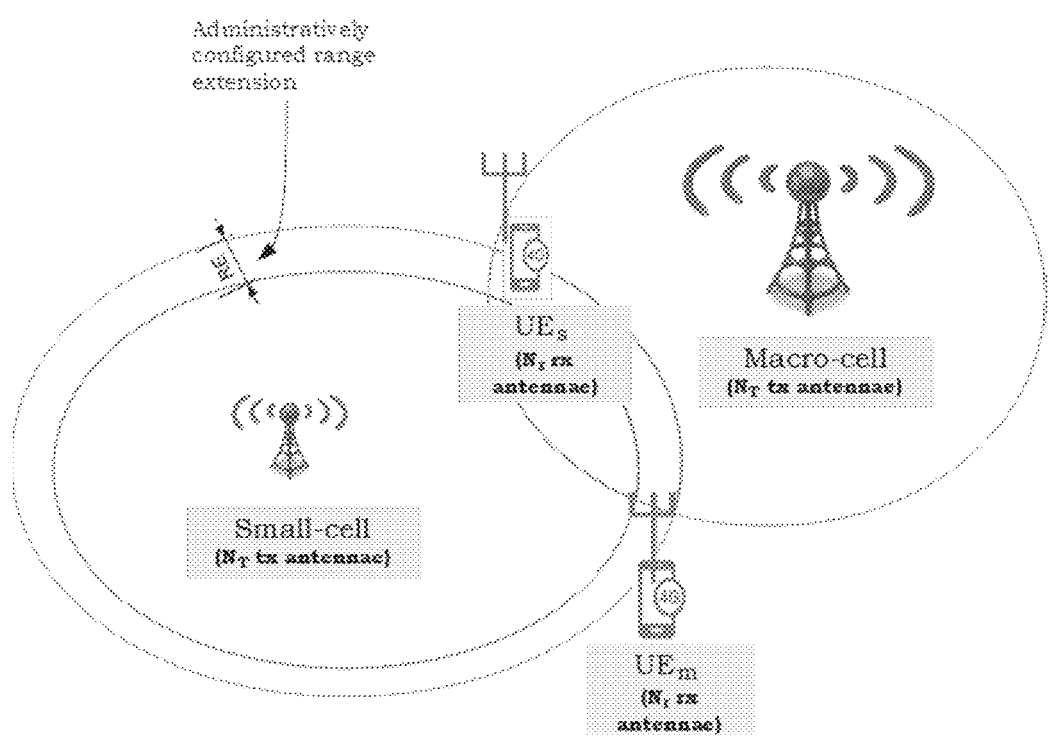
FIG. 1 illustrates Inter-cell Interference Coordination (ICIC) deployment for heterogeneous networks.
Figure 2:
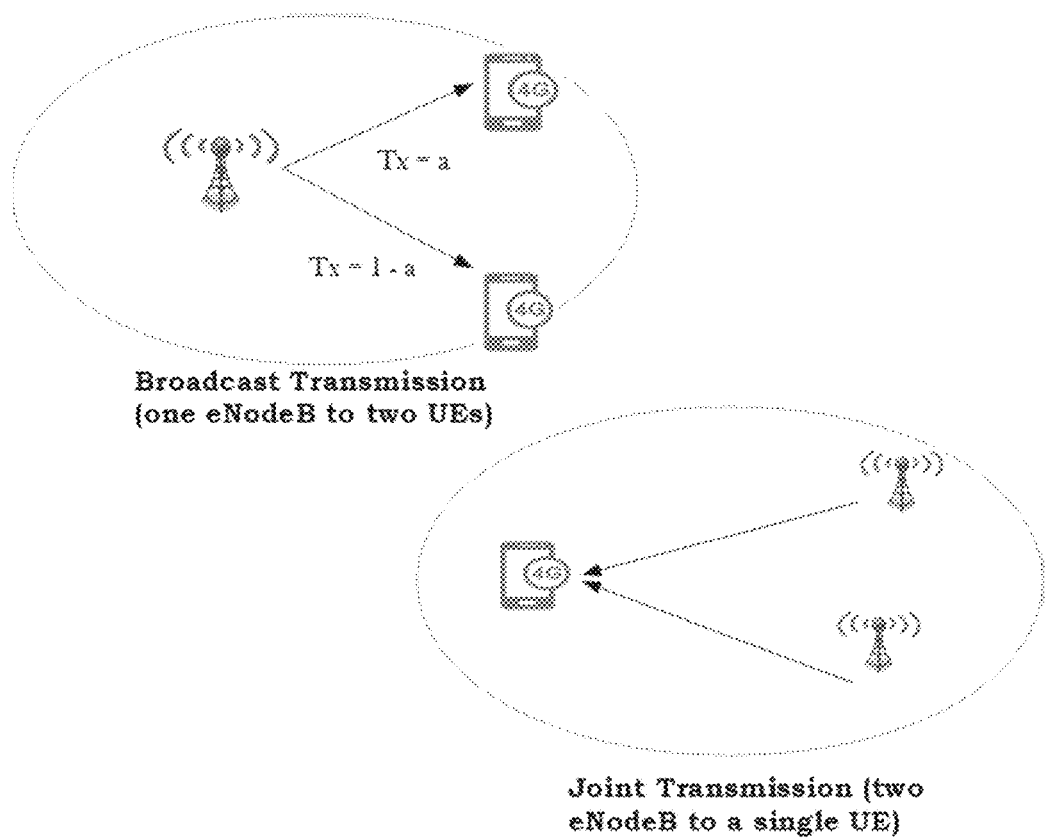
FIG. 2 shows different forms of multi-user MIMO transmission using Coordinated Multipoint in accordance with a state-of-the-art.
Figure 3:
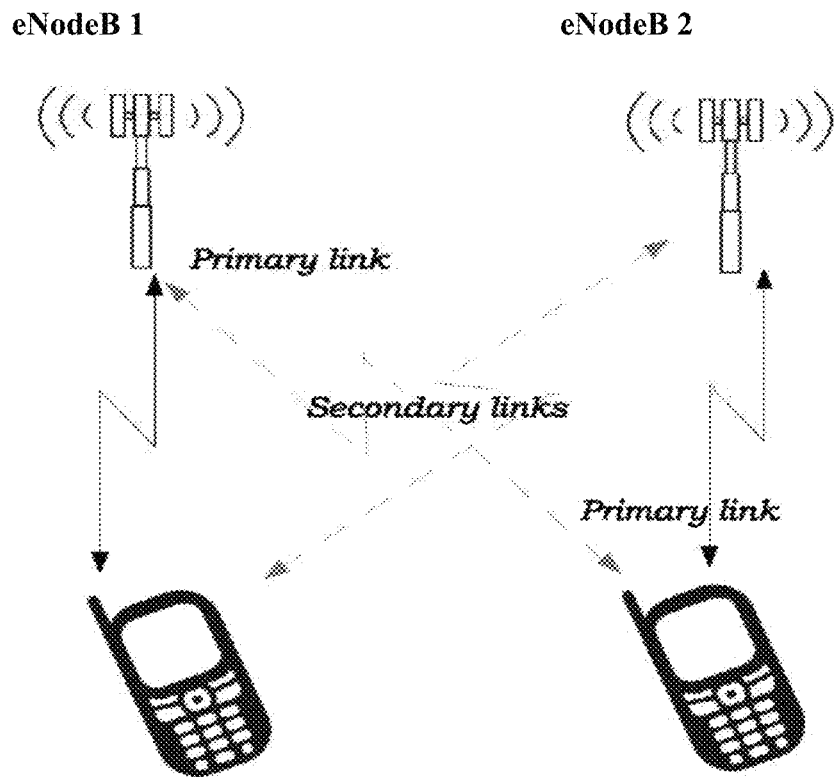
FIG. 3 shows an urban network deployment comprising one macro-cell and several small-cells in accordance with the known art.

Exemplary embodiments will now be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising"

when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

The features provided by the disclosed system in the present invention, may be accessed remotely, in one or more embodiments, and/or through an online service provider. Such types of online service providers operates and maintains the computing systems and environment, such as server system and architectures, that promote the delivery of portable electronic documents in a communication network. Typically, server architecture includes the infrastructure (e.g. hardware, software, and communication lines) that offers online services.

The detailed description follows in parts to terms of processes and symbolic representations of operations performed by conventional computers, including computer components. For the purpose of this invention, a computer may be any microprocessor or processor (hereinafter referred to as processor) controlled device such as, by way of example, personal computers, workstations, servers, clients, minicomputers, main-frame computers, laptop computers, a network of one or more computers, mobile computers, portable computers, handheld computers, palm top computers, set-top boxes for a TV, interactive televisions, interactive kiosks, personal digital assistants, interactive wireless devices, mobile browsers, or any combination thereof.

For the most part, the operations described herein are operations performed by a computer or a machine in conjunction with a human operator or user that interacts with the computer or the machine. The programs, modules, processes, methods, and the like, described herein are but an exemplary implementation and are not related, or limited, to any particular computer, apparatus, or computer language.

Rather, various types of general purpose computing machines or devices may be used with programs constructed in accordance with the teachings described herein.

It would be well appreciated by persons skilled in the art that the term "module" and "unit" can be interchangeably used in the present invention.

Figure 4:
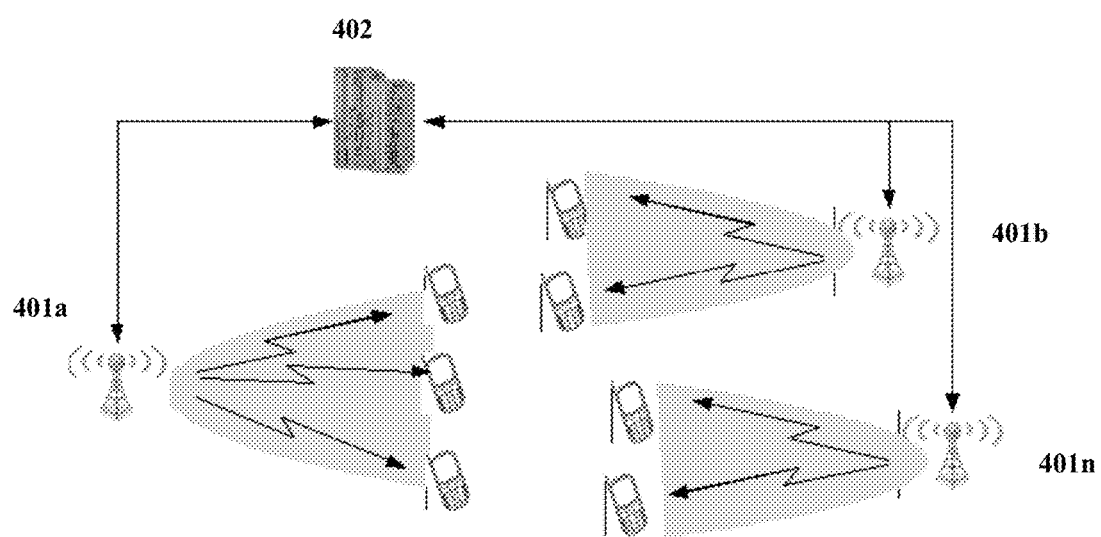
FIG. 4 depicts a distributed radio architecture with a plurality of network nodes and a central scheduler according to the present invention.

FIG. 4 depicts a distributed radio architecture with a plurality of network nodes and a central scheduler according to the present invention. The network nodes (401a, 401b . . . 401n) are scattered over a geographical area, which is deemed a cell. Like the traditional concept of a cell, it is allocated a certain amount of spectrum and a certain overall power, which it uses for providing service to the users (users equipped with terminal equipment, hence UE) in the area. The network nodes are connected to a central scheduler or base-band unit (402), which provides common services (such as control signaling and packet routing to the network core). It will be well appreciated by a person skilled in the art that it also provides a vital scheduling and coordination function.

Further, each network node has a number of transmit antennae Nt, each UE has a number of transmit antennae Nr and thereby, Nt=Nr*(K+1). K is a number (typically between 2 and 6) which corresponds to the expected number of UEs to be provided service by one network node, at one time.

When a network node transmits to a given UE, it selects a transmission method and precoding technique so as to maximize the signal strength and minimize the inter-stream interference for that UE, as per the well-known methodology of MIMO pre-coding. However, any other UE in the vicinity will also receive this transmission. If the other UE is simultaneously receiving a transmission from another network node, then the former is treated as noise. It is well known that this inter-node interference forms a limiting factor for this kind of network.

In accordance with the present invention, the central scheduler (402) identifies a target set of UEs for scheduling and co-resident UEs for each network node.

The UEs are selected based on a bidding mechanism, where individual network nodes shortlist UEs for scheduling and present this to the central scheduler. The central scheduler (402) in turn identifies the target UEs and the co-residents for each network node. In the next step, the network node uses a specific algorithm to pre-code the transmission to the target set of UEs so as to maximize their signal to noise power and simultaneously minimize the impact on the co-resident UEs.

In addition to the above, distributed pre-coding mechanism, the central scheduler executes the scheduling by identifying the UEs which each network node has to transmit. Each UE which is visible to a network node and not part of the transmit set must either be not scheduled in this iteration, or has to be added to this UEs co-resident set. The algorithm used for precoding works best if the channel matrices for the co-resident and target sets are as independent (in a vector space sense) from each other as possible; this also holds true for the members of the target sets themselves.

Each network node, at each instant, has to simultaneously transmit to a number of UEs, known as the target set. The target set is provided by the central scheduler as the output of the scheduling exercise. Along with the target set, each network node has a set of UEs known as the co-resident set; these are the UEs which shall be receiving data from other network nodes at the same time-instant. Hence, the network node must endeavor to provide service to its target set in a manner so as to minimize the interference that it generates to each member of the co-resident step. The network node implements this by appropriately pre-coding the transmission. The pre-coding is a linear matrix operation which simultaneously separates the channels of the members of the target set and also minimizes the interference for the co-resident steps. The pre-coding is implemented using standard matrix operations (singular value decomposition, block Cholesky decomposition and finally inversion of an upper triangular matrix) followed by Tomlinson Harashima pre-coding of the transmit vector so as to pre-subtract anticipated interference.

Figure 5:
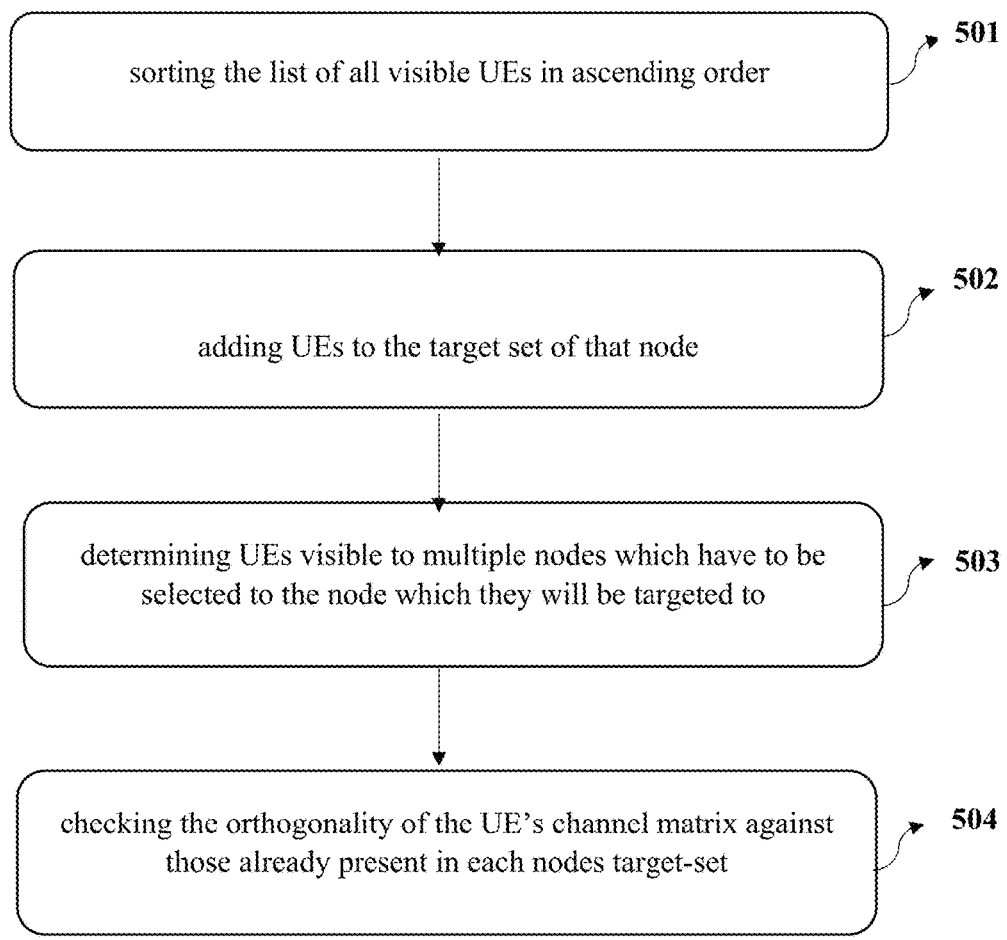
FIG. 5 illustrates a scheduling operation by the central scheduler in accordance with the present invention.

FIG. 5 illustrates a scheduling operation by the central scheduler in accordance with the present invention. In step 501, sorting the list of all visible UEs (as reported by all network nodes) in ascending order of the number of nodes reporting to them. In step 502, adding UEs to the target set of that node only visible to one node. In step 503, determining UEs visible to multiple nodes which have to be selected to the node which they will be targeted to. In step 504, checking. By the scheduler, the orthogonality of the UE's channel matrix against those already present in each nodes target-set. The least orthogonal node (subject to a minimum) must accept this UE in the target set.

In an exemplary embodiment of the present invention, two individual transmitters are considered which has to transmit data to K receivers each. The transmitters have to make sure that the cross-user interference is minimized. The transmitter is deemed to have $N_t = KN_r$ transmit antennae and each of the K receivers will have $N_r$ receive antennae. The description below is for K=2, but can be modified for higher values of K as shall be shown subsequently. Each transmitter orders the UEs as $UE_2$ and $UE_2$, with channel matrices $H_1$ and $H_2$ respectively. Each transmitter has $N_t=2*N_r$ antennae for transmitting whereas each receiver has $N_r$ antennae. Thus, each channel matrix is an $N_r \times N_t$ matrix. Each transmitter transmits to its intended UE a stream $x_i$ pre-coded using an $N_t \times N_t$ pre-coding matrix $F_i$. The composite channel matrix as seen by the $i^{th}$ transmitter to be $H_i = [i,1 H_{i,2}]^T$.

Further, each channel matrix $H_i$ is a 2×4 matrix $[H_{i,k} H_{i,k}]$, where $H_{i,\ k+p}$ is the $1 \times N_t$ matrix corresponding to the path between to the $i^{th}$ antenna of the $k^{th}$ receiver.

$$H = \begin{bmatrix} H1 \\ H2 \end{bmatrix} = \begin{bmatrix} H11 \\ H12 \\ H21 \\ H22 \end{bmatrix} \quad (1)$$

The method works by expressing the complex hermitian matrix $HH^H$ into three matrices, with the first one being lower triangular, the next one being block diagonal and the third one being a conjugate transpose of the first matrix. Taking the original form of H as in (1), the decomposed form the matrix is obtained as in (2).

$$HH^H = \begin{bmatrix} H_1 H_1^H & H_1 H_2^H \\ H_2 H_1^H & H_2 H_2^H \end{bmatrix} \quad (2)$$

$$= (I + D^H U^H)\Delta(I + DU)$$

Where, $$U = \begin{bmatrix} 0 & I_{NrxNr} \\ 0 & 0 \end{bmatrix}, \Delta = \begin{bmatrix} \Delta_1 & 0 \\ 0 & \Delta_2 \end{bmatrix}$$

$$\Delta_1 = H_1 H_1^H$$

$$D = \Delta_1^{-1}(H_1 H_2^H)$$

$$\Delta_2 = (H_2 H_2^H - D^H \Delta_1 D)$$

The transmitter uses a pre-coding matrix F as given in (3), $$F = H^H (I - DU)\varphi \quad (3)$$

$$\varphi = \begin{bmatrix} \varphi_1 & 0 \\ 0 & \varphi_2 \end{bmatrix}$$

Where, $\varphi_1 \varphi_2$ are $N_r \times N_r$ power loading matrices selected by the transmitter. The received signal is given by (4), where $$\begin{aligned} Y &= HF_x + n \\ &= HH^H(I - DU)\varphi\begin{bmatrix} x_1 \\ x_2 \end{bmatrix} + n \\ &= (I + D^H U^H)\Delta\varphi\begin{bmatrix} x_1 \\ x_2 \end{bmatrix} \end{aligned} \quad (4)$$

$$\begin{bmatrix} y_1 \\ y_2 \end{bmatrix} = \begin{bmatrix} \Delta_1 \varphi_1 & 0 \\ 0 & \Delta_2 \varphi_2 \end{bmatrix} \begin{bmatrix} x_1 \\ Kx_1 + x_2 \end{bmatrix}$$

$$K = \Delta_2^{-1} \varphi_2^{-1} D^H \Delta_1 \varphi_1$$

Thus, the common channel is effectively divided into two separate channels, with effective channel matrix $H_{eff,m} = \varphi_m \Delta_m$. From equation 4, we can see that the transmit stream to $UE_1$ is interference-free and has the same effective channel matrix as if the second UE did not exist. On the other hand, the stream to UE2 has an interference term $Kx_1$, plus a reduced effective channel matrix $H_2 - \Delta$, where $\Delta$ comes from the SVD (Singular Value Decomposition) of the Hermitian matrix $D^H \Delta_1$ D. The interference can now be pre-subtracted using Tomlinson Harashima pre-coding or more expensive lattice coding methods. Thereby, nearly interference free transmission to both UEs is achieved.

The loss of channel power to $UE_2$ can be made up to an extent by adjusting the power loading matrix $\varphi_2$ at the expense of $UE_1$. The choice of the power loading matrix $\varphi$, must be so as to maximize the channel capacity for both $UE_1$ and $UE_2$, while meeting the transmission power constraint. In this case, the transmission power constraint can be written as: $H^H$ $$\begin{aligned} Tr(FF^H) &= Tr\big((H^H(I - DU)\varphi)(H^H(I - DU)\varphi)^H\big) \\ &= Tr\big((I - DU)H^H(I - DU)^H\big) \\ &= Tr(\varphi \Delta \varphi^H) \end{aligned} \quad (5)$$

In the same way, the abovementioned broadcast technique can be modified for an embodiment of Active null-forming (ANF), where the network node does not have direct knowledge of the channel matrix $H_i$, but operates on the basis of the feedback of the individual UEs. The individual matrices for the two UEs can be written in the form $$H_i = U_i [\Sigma_i | 0][V_i \tilde{V}_i]^H \quad (6)$$

where $V_i$, $\tilde{V}_i$ are each a matrix of the form $[V_1 V_2]$ mutually orthonormal column vectors corresponding to the positive and zero eigenvalues of $H_i$. For any feedback based pre-coding scheme, the UEs will report the matrix V to the network node (or the closest member of V from a pre-selected code-book) and the network node will use a pre-coding matrix $V^H$. Since, $H_i$ is a 2×4 matrix, it will a maximum of two positive eigenvalues.

$$\begin{bmatrix} H_1 \\ H_2 \end{bmatrix} = \begin{bmatrix} U_1 \Sigma_1 & 0 \\ 0 & U_1 \Sigma_2 \end{bmatrix} \begin{bmatrix} V_1^H \\ V_2^H \end{bmatrix} \quad (7)$$

$$= \begin{bmatrix} U_1 \Sigma_1 & 0 \\ 0 & U_2 \Sigma_2 \end{bmatrix} V^H$$

Further, it is to be noted that $V_{11}$, $V_{12}$ are the mutually orthonormal rows from the SVD of the channel matrix $H_1$ corresponding to the first receiver and $V_{21}$, $V_{22}{}^H$ are mutually orthonormal column vectors from the second channel matrix. However, the vectors from the first set are not orthonormal with the second, i.e. $V_{1,j}{}^H V_{2k}$, j, k ∈ (1,2) ≠ 0. Indeed, this is the source of interference between the two streams. Hence, $$V^H V = \begin{bmatrix} I_{NrxNr} & Vc \\ V_c^H & I_{NrxNr} \end{bmatrix}$$

$$Vc = \begin{bmatrix} V_{1,1}^H V_{2,1} & V_{11}^H V_{2,2} \\ V_{1,2}^H V_{2,1} & V_{1,2}^H V_{2,2} \end{bmatrix}$$

If the two channels are uncorrelated, the terms in $V_c$ to be independent variables with mean 0 and fixed variance. $V_c$ is small, because its absolute eigenvalues are much less than 1. It clear that the worst case is when $V_c=I$. In this case, the interference between the two channels is maximum.

Therefore, $V^H V$ can be rewritten as, $$V^H V = (I + D^H U^H) \begin{bmatrix} \Delta_1 & 0 \\ 0 & \Delta_2 \end{bmatrix} (I + DU) \quad (8)$$

Combining with equation (7), $$\Delta_1 = I, D = Vc, \Delta_2 = (I - D^H D) \quad (9)$$

Now, choosing a precoding matrix as $F = V(I-DU)\varphi$ and the transmit signal is expressed as, $$y = HFx + n = U\Sigma V^H V(I - DU)\varphi x + n \quad (10)$$

$$= U(1 + D^H U^H) \begin{bmatrix} \Delta_1 & 0 \\ 0 & \Delta_2 \end{bmatrix} \varphi x + n$$

$$= U\Sigma \begin{bmatrix} \Delta_1 & 0 \\ D^H \Delta_1 & \Delta_2 \end{bmatrix} \varphi [x^1 x^2]^T$$

$$= U\Sigma \begin{bmatrix} I & 0 \\ 0 & I - D^H D \end{bmatrix} [\varphi_1 x_1 \quad K\varphi_1 x_1 + \varphi_2 x_2]^T$$

$$K = (I - D^H D)^{-1} D^H$$

Minimum interference for UE2 is achieved by choosing $\varphi_1$, $\varphi_2$, $x_2$ so that $\|(K\varphi_1 x_1 + \varphi_2 x_2)\|$ is minimized in (10). The constraint is that $\|x_2\| \leq \|x_1\|$. In general, when the two paths are independent of each other, D→0, and K≈$D^H$. The equality is achieved by adjusting the power loading factors $Tr\varphi_1$ and $Tr\varphi_2$, such that $\|D\varphi_1\| = \|\varphi_2\|$ and $x_2 = -x_1$. The individual elements of $\varphi_1$ can be chosen by the water-filling model so as to further optimize the SNR for UE1, whereas the individual elements of $\varphi_2$ are chosen to balance the amplitudes of the components of $x_2$. Effectively, the transmitter diverts a fraction of the available energy to create a deliberate null at the co-resident UE, without sacrificing the optimal pre-coding matrix for the targeted UE.

Figure 6:
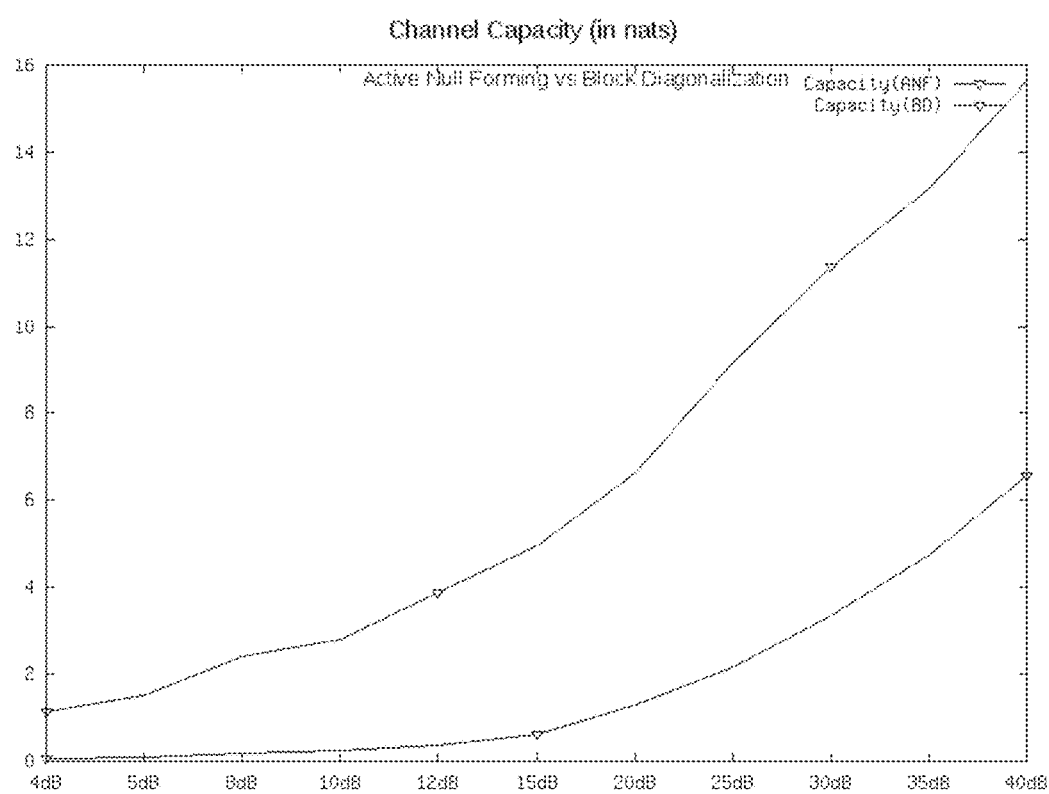
FIG. 6 shows simulation results for relative channel capacity for ANF and BD techniques according to the present invention.
Figure 7:
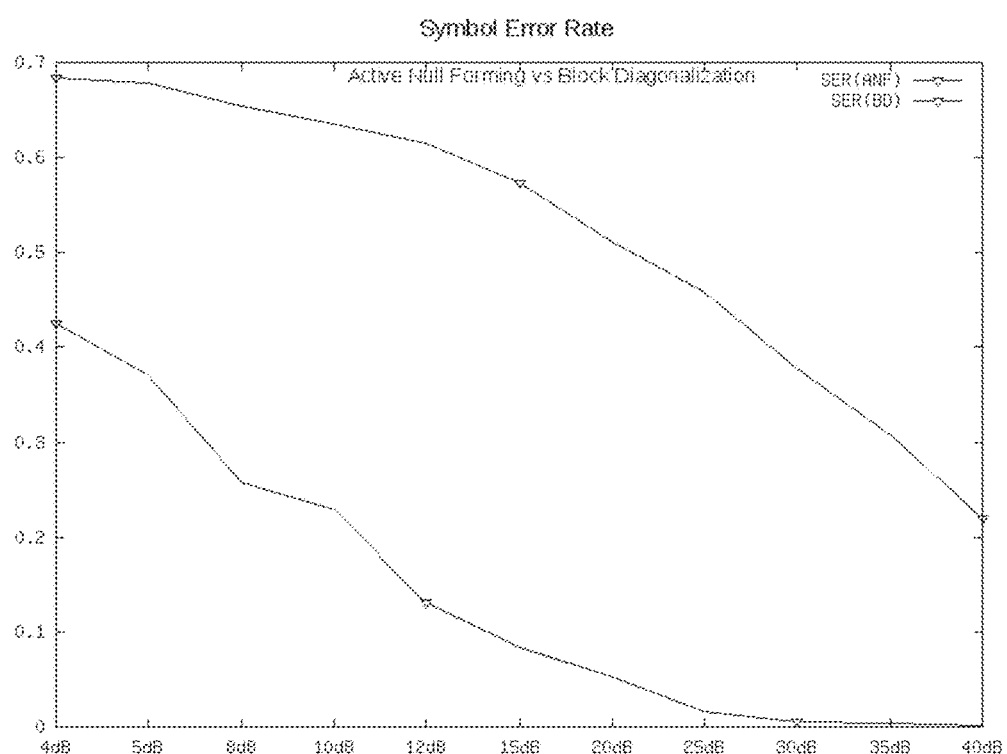
FIG. 7 shows simulation results for relative symbol error rates for ANF and BD techniques according to the present invention.

As our simulations show in FIG. 5 and FIG. 6, the method as per the present invention significantly out-perform the BD technique, especially when the different channels are independent and hence det(D) is relatively small. The difference between the capacities of the two techniques are explained by considering the relative SER achieved by the two methods i.e. Active null forming (ANF) and Block Diagonalization (BD) techniques. Even for good values of SNR, the SER for the BD case is purely dictated by the relative independence of the eigenspace of the two channel matrices. On the other hand, the pre-coding approach has a performance which improves steadily as the SINR (signal-to-noise-plus-interference ratio) improves.

The situations where the BD based zero-forming technique can match the ANF technique are where the two channel matrices are relative correlated, so that D←I. In this situation, the cell can switch between the ANF technique and the BD techniques flexibly, based on the value of D. Due to UE specific reference signals, no explicit signaling is required to switch between the two approaches.

The solution described above can be directly extended to multiple co-resident UEs alongside a single target UE. The network node has $N_t$ transmit antennae with several UEs in its immediate range. At each transmit opportunity, it receives channel state information implicitly (through uplink reference signals in TDD mode) or explicitly {feedback on a shared data channel (PUSCH) in FDD mode}. It uses this feedback to choose one UE as the target for transmitting data. It then uses the CSI (channel state information) of the other UEs to code the transmission in such a way so as to minimize interference for all the others. The $i^{th}$ UE has an antenna count of $Ni < N_t$. Considering, the number of antenna available to the target UE as Nr and the total number of antennae for all the other UEs as $Nu = \Sigma_i N_i - Nr$. The channel matrix between the network node and the $i^{th}$ UE is given as Hi.

Each channel matrix $H_i$ has a singular value decomposition $U_i \Sigma_i V^*$, where Ui,Vi are orthonormal matrices (their columns are mutually orthonormal) and $Z_i$ is a diagonal matrix. Since $H_i$ is a matrix with more rows than columns, the SVD actually looks like $$Hi - Ui[\Sigma_1 0][Vi \; \tilde{V}i]^*$$

The transmitting network node uses a pre-coding matrix of the form $$F = [Vr \; W] \begin{bmatrix} \Lambda & -D \\ 0 & \Lambda^H \end{bmatrix}$$

where, $V_r$ is the sub-matrix of $V_i$ corresponding to the non-null eigenvalues and Λ is a $N_r \times N_r$ matrix of full rank. The matrix D is given by $D = V_r{}^H W(\Lambda^H)^{-1}$. The pre-coding matrix F is then applied on a transmit vector $[x \; \tilde{x}]^T$, where x is the vector of $N_r$ symbols (post-modulation) to be transmitted to the target UE. The matrices W, Λ and the vector x̃ of size $N_t$-$N_r$ is chosen so as to minimize interference, while honouring the transmit power constraint trFFH≤P. This can be done using many methods; including but not limited to barrier optimization, Tikhonov regularization, ridge regression and other similar techniques.

In an advantageous embodiment, the disclosed methodology according to the present invention provides an improved Inter-cell Interference Coordination, where two network nodes with overlapping coverage regions simultaneously transmit to UEs attached to them, and coordinate so as to not cause cross-cell interference.

The present invention is applicable to all types of on-chip and off chip memories used in various in digital electronic circuitry, or in hardware, firmware, or in computer hardware, firmware, software, or in combination thereof. Apparatus of the invention can be implemented in a computer program product tangibly embodied in a machine-readable storage device for execution by a programmable processor; and methods actions can be performed by a programmable processor executing a program of instructions to perform functions of the invention by operating on input data and generating output. The invention can be implemented advantageously on a programmable system including at least one input device, and at least one output device. Each computer program can be implemented in a high-level procedural or object-oriented programming language or in assembly or machine language, if desired; and in any case, the language can be a compiled or interpreted language.

Suitable processors include, by way of example, both general and specific microprocessors. Generally, a processor will receive instructions and data from a read-only memory and/or a random access memory. Generally, a computer will include one or more mass storage devices for storing data file; such devices include magnetic disks and cards, such as internal hard disks, and removable disks and cards; magneto-optical disks; and optical disks. Storage devices suitable for tangibly embodying computer program instructions and data include all forms of volatile and non-volatile memory, including by way of example semiconductor memory devices, such as EPROM, EEPROM, and flash memory devices; magnetic disks such as internal hard disks and removable disks; magneto-optical disks; CD-ROM and DVD-ROM disks; and buffer circuits such as latches and/or flip flops. Any of the foregoing can be supplemented by, or incorporated in ASICs (application-specific integrated circuits), FPGAs (field-programmable gate arrays) and/or DSPs) digital signal processors).

It will be apparent to those having ordinary skill in this art that various modifications and variations may be made to the embodiments disclosed herein, consistent with the present invention, without departing from the spirit and scope of the present invention. Other embodiments consistent with the present invention will become apparent from consideration of the specification and the practice of the description disclosed herein.

What is claimed is:

1. A system for scheduling and mitigating cross-cell interference, said system comprising:
    a plurality of network nodes, each having at least two transmit antennas, configured to handle multiple input multiple output channels, communicatively coupled with a plurality of co-residents user equipment (UEs);
    a central scheduler configured to control scheduling of said plurality of network nodes;
    wherein each network node is configured to select a plurality of UEs and provide a short list of UEs to the central scheduler;
    based at least in part on the short list of UEs, the central scheduler is configured to identify, for a first network node, a target set of UEs and a subset of co-residents UEs visible to both the first network node and a second network node, wherein the target set of UEs and the subset of co-residents UEs have sufficiently mutually orthogonal channel matrices relative to one another; and
    based at least in part on the identified target set of UEs and subset of co-residents UEs, the first network node is configured to pre-select a transmission pre-coding for transmitting one or more signals to the identified target UEs without substantially impacting signal transmission power with respect to the identified co-residents UEs.

2. The system as claimed in claim 1, wherein the central scheduler identifies the target set of UEs based at least in part on sufficient mutual orthogonality of a UE's channel matrix with respect to matrices of another node's target set.

3. The system as claimed in claim 1, wherein the central scheduler is configured to receive transmission parameters from one or more of the UEs.

4. The system as claimed in claim 3, wherein said transmission parameters comprises channel capacity information for each of the plurality of co-residents UEs and power constraint information at each of the network nodes.

5. The system as claimed in claim 1, wherein the transmission pre-coding comprises a pre-coding matrix.

6. The system as claimed in claim 5, wherein the pre-coding matrix is a linear matrix operation, which simultaneously separates the channels of the UEs of the target set of UEs.

7. A method for scheduling and mitigating cross-cell interference, said method comprising:
    controlling scheduling, by a central scheduler, of a plurality of network nodes, each having at least two transmit antennas, and each network node is configured to handle multiple input multiple output channels, communicatively coupled with a plurality of co-residents user equipment (UEs);
    selecting, by each network node, a plurality of UEs visible to the network nodes;
    providing a short list of UEs to the central scheduler;
    identifying, by the central scheduler, a target set of UEs and the co-residents UEs for each network node based at least in part on the short list of UEs provided by each network node, wherein a co-resident UE is one that is visible to both a first network node and a second network node, and wherein the target set of UEs and the co-residents UEs have sufficiently mutually orthogonal channel matrices; and
    pre-selecting, by the first network node, a transmission precoding for transmitting one or more signals to the target UEs without substantially impacting transmission with respect to the identified co-residents UEs, wherein the transmission precoding is based at least in part on a combination of the channel matrices of the target set of UEs and the co-residents UEs.

8. The method as claimed in claim 7, wherein the method comprises identifying, by the central scheduler, the target set of UEs based on orthogonality of the UE's channel matrix against those previously present.

9. The method as claimed in claim 7, wherein the central scheduler is configured to receive transmission parameters from one or more of the UEs.

10. The method as claimed in claim 9, wherein said transmission parameters comprises channel capacity information for each of the plurality of co-residents UEs and power constraint information at each of the network nodes.

11. The method as claimed in claim 7, wherein pre-selecting the transmission precoding comprises implementing a pre-coding matrix.

12. The method as claimed in claim 11, wherein the pre-coding matrix comprises a linear matrix operation, which simultaneously separates the channels of the UEs of the target set of UEs.

13. The method as claimed in claim 7, further comprising:
sorting the list of all visible UEs in ascending order of the number of nodes;
adding UEs to the target set of that node only visible to one node;
determining UEs visible to multiple nodes, which have to be selected to the node that they will be targeted to; and
checking, the orthogonality of the UE's channel matrix against those already present in each node's target set.

14. A system for scheduling and mitigating cross-cell interference, said system comprising:
a plurality of network nodes, each having a plurality of transmit antennas, configured to handle multiple input multiple output channels, communicatively coupled with a plurality of co-residents user equipment (UEs);
a central scheduler configured to control scheduling of said plurality of network nodes;
wherein each network node is configured to select a plurality of UEs and provide a short list of UEs to the central scheduler;
the central scheduler in turn identifies a target set of UEs and the co-residents for each network node; and
the network nodes are configured to pre-select signal-to-noise transmission power to the identified target UEs without substantially impacting transmission of co-residents UEs, wherein pre-selecting signal-to-noise transmission power to the target UEs comprises implementing a pre-coding matrix.

\* \* \* \* \*